Nov. 11, 1930.  J. GOHY  1,781,383
MACHINE FOR THE MANUFACTURE OF CARD CLOTHING
Filed Sept. 7, 1929   5 Sheets-Sheet 1

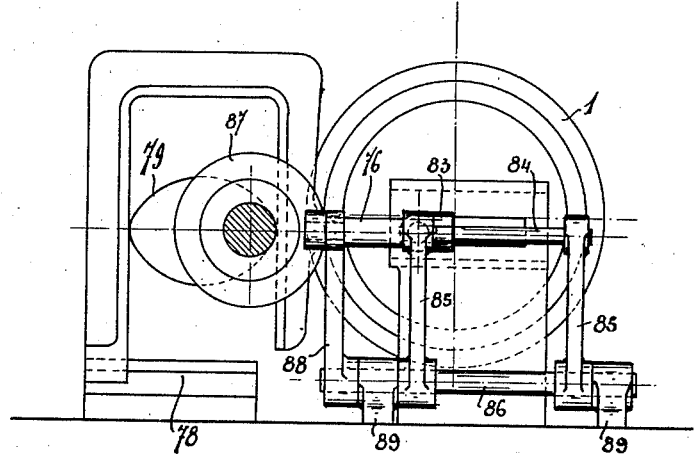
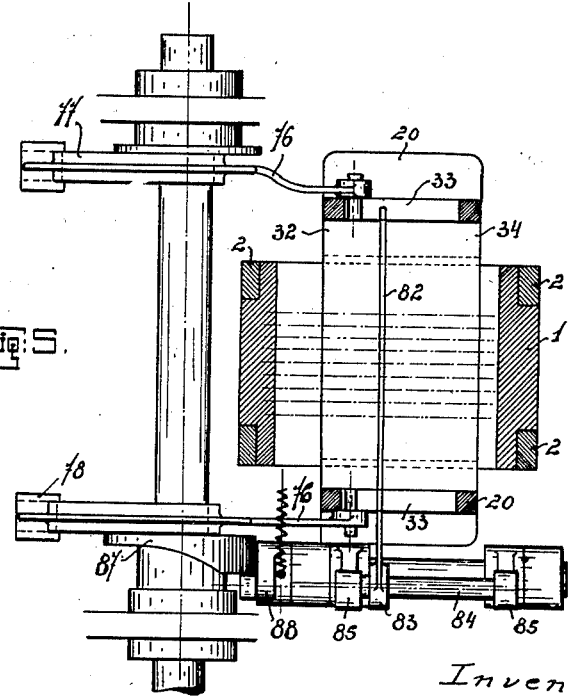

Nov. 11, 1930.  J. GOHY  1,781,383
MACHINE FOR THE MANUFACTURE OF CARD CLOTHING
Filed Sept. 7, 1929  5 Sheets-Sheet 4
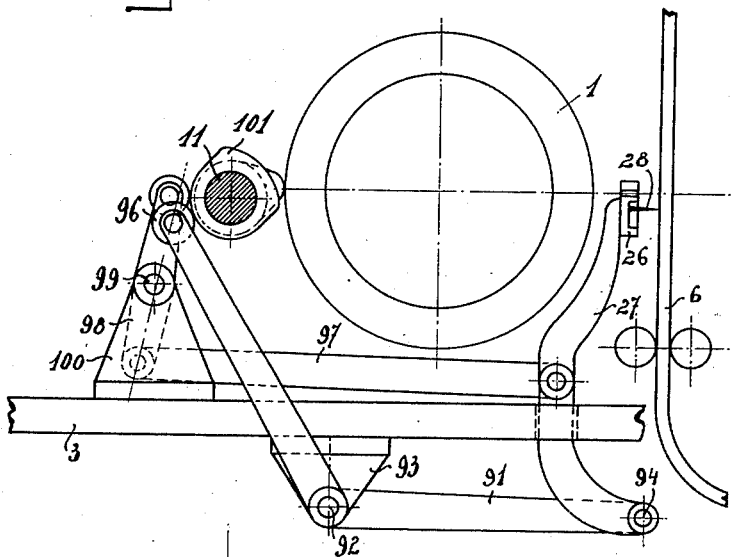
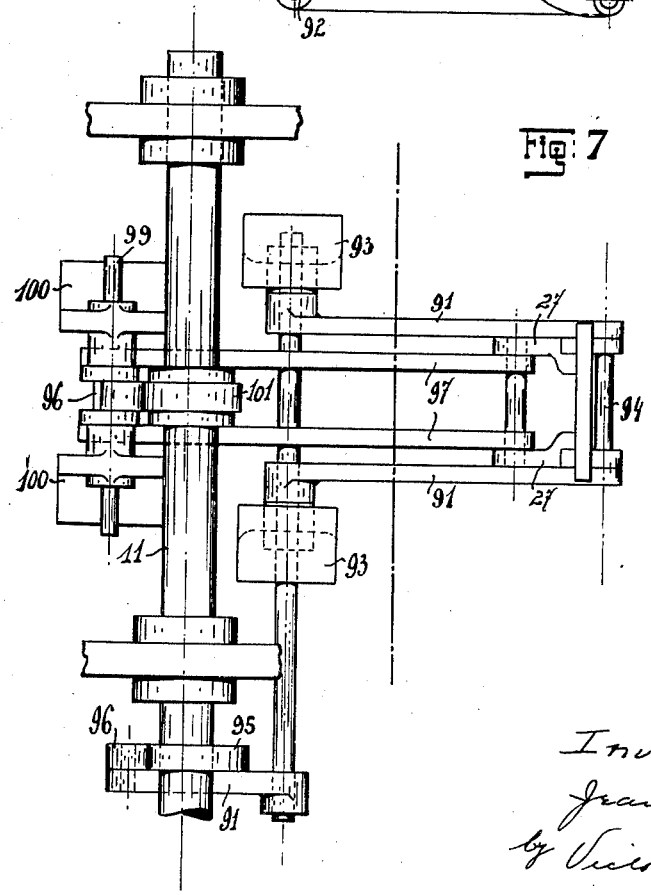
Inventor,
Jean Gohy
by Victor D. Borst
atty

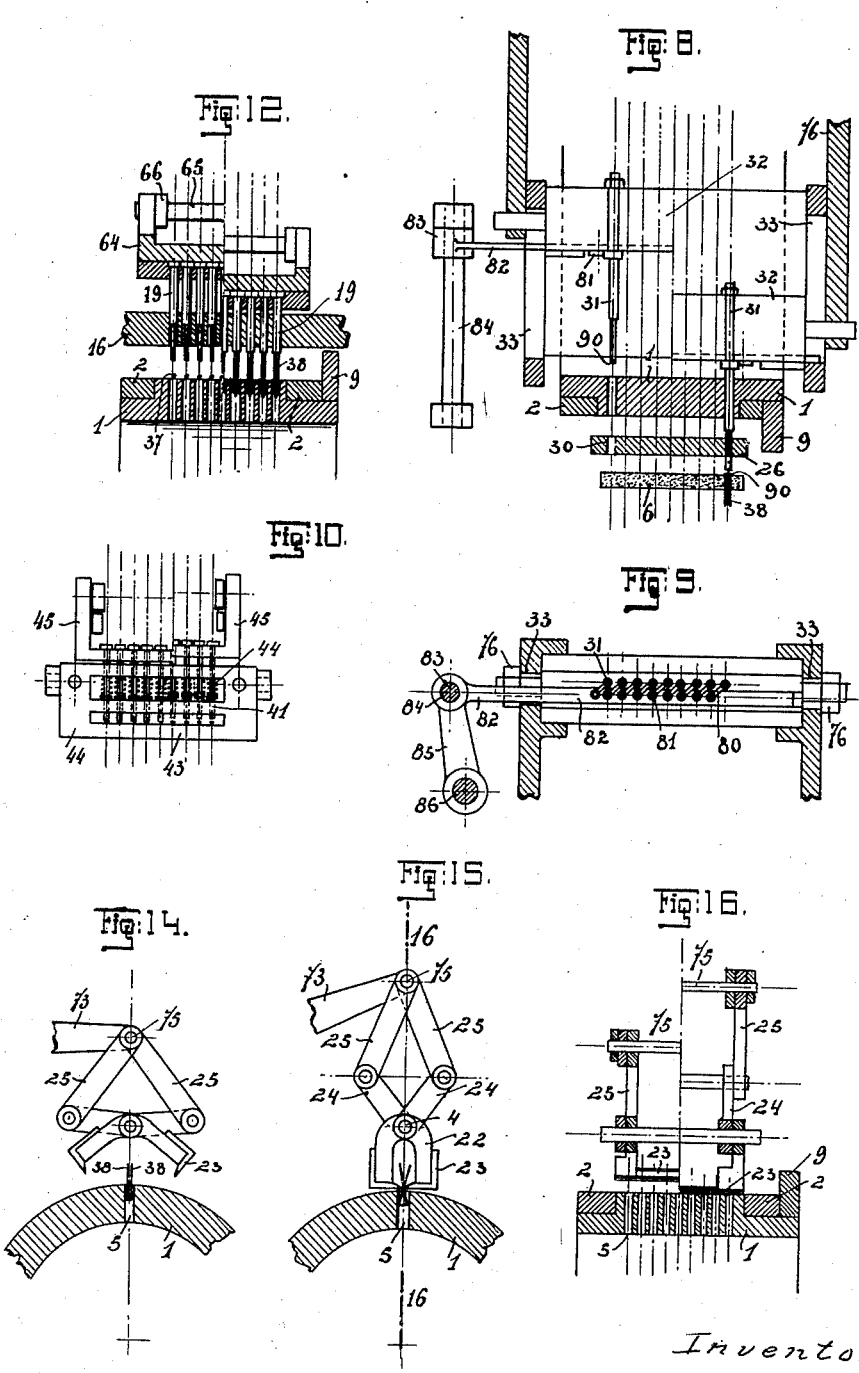

Patented Nov. 11, 1930

1,781,383

UNITED STATES PATENT OFFICE

JEAN GOHY, OF SPA, BELGIUM, ASSIGNOR TO DESPA & FILS (SOCIÉTÉ EN COMMANDITE PAR ACTIONS), OF VERVIERS, BELGIUM, A COMPANY

MACHINE FOR THE MANUFACTURE OF CARD CLOTHING

Application filed September 7, 1929, Serial No. 390,898, and in Belgium September 7, 1928.

This invention relates to a machine for the manufacture of card clothing. The object is to provide a machine of this type allowing the insertion that is the driving in or the placing in position of the teeth forming the clothing over the whole width of the card surface in successive rows in a single operation which considerably augments the speed of manufacture and therefore of production.

With this object in view, the machine forming the subject matter of the invention is essentially characterized by the combinations of parts hereinafter fully described and pointed out in the appended claims.

On the annexed drawings:

Fig. 4 is an elevation showing detached the arrangement for producing the rotation of the teeth before their insertion.

Fig. 5 is a plan of this mechanism.

Fig. 6 is a detail view in elevation of the mechanism operating the piercing device forming in the foundation of the clothing the holes for receiving the teeth.

Fig. 7 is a plan view of the mechanism shown in Fig. 6 the table of the machine being removed to show the parts arranged underneath.

Figs. 8 and 9 are a sectional plan and elevation showing certain details of the arrangement for rotation and insertion shown in Figs. 4 and 5.

Fig. 10 is a detached view in front elevation of one of the nippers forming part of the feed mechanism.

Fig. 11 is an elevation of the knife operating the shearing of the wires arranged parallel to each other.

Fig. 12 is an elevation partly in section of the inserting nippers and shows their cooperation with the rotary drum.

Fig. 13 is a plan view partly in section showing the co-operation of the knife with the inserting nippers this section being taken on a line 13—13 Fig. 1.

Figs. 14, 15 and 16 are detail views showing separately the operation of the bending nippers of the teeth Fig. 16 being a section taken on line 16—16 Fig. 15.

Fig. 17 is a detail view showing the position of the piercing member with respect to the foundation of the card clothing at the time of piercing.

Figure 1:
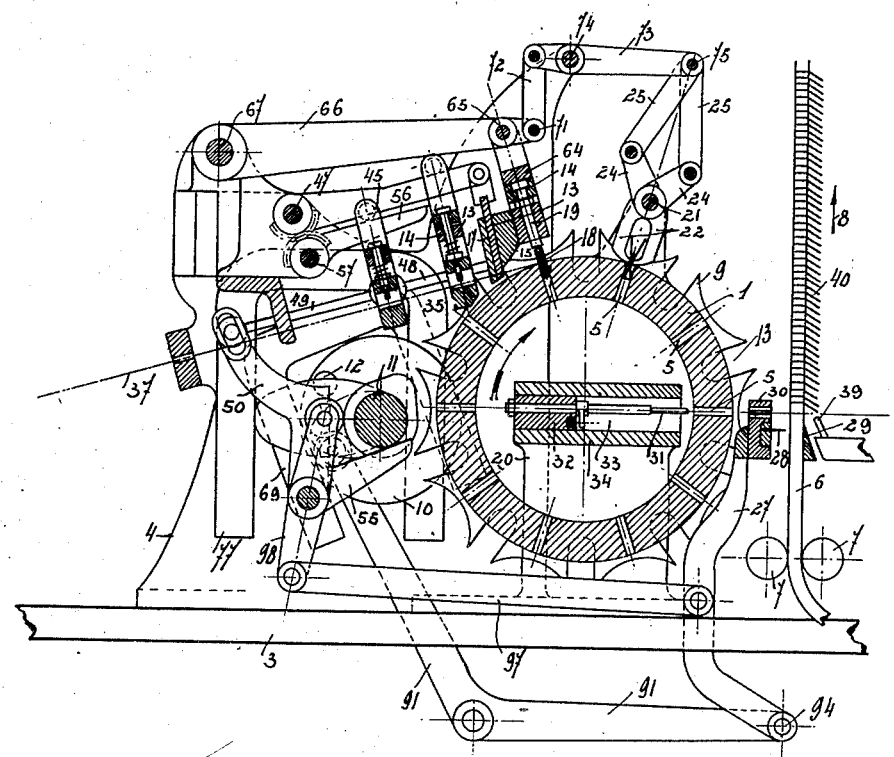
Fig. 1 shows diagrammatically the arrangement of the whole machine; this figure corresponds to a section taken through the axes of the holes arranged in the drum in the same vertical plane each hole shown forming part of a row arranged along a generator of the drum.
Figure 2:
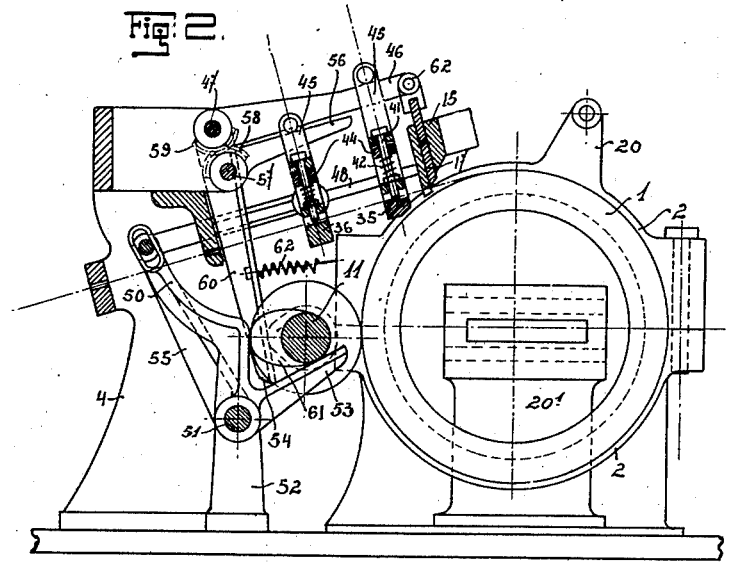
Fig. 2 is a similar vertical diagrammatic section showing more especially the mechanism for operating the feed nippers.

As is shown more especially in Figs. 1, 3, 8, 12, 14 and 16 the machine comprises as the principal element, a drum 1 capable of rotating freely in bearing rings 2 (Figs. 8, 12 and 16) forming supports affixed to the table 3 forming part of the frame 4 of the machine. This drum 1 is pierced along generatrices with a certain number of holes 5 arranged radially and the number of which in each row corresponds to the number of pairs of teeth which should be arranged in the card clothing 6, moved intermittently in known manner between guide rollers 7 in the direction of the arrow 8 (Fig. 1).

This drum 1 receives an intermittent rotary movement from a plate 9 mounted on one of the sides of the drum and which co-operates with a cam 10 mounted on the main shaft 11 operating the machine. This cam 10 carries a roller 12 engaging at each rotation of the shaft 11 in a radial slot 13 formed in the plate 9 so that at each rotation of the main shaft 11 the roller 12 advances the drum 1 an amount corresponding to the space left between two consecutive rows of holes 5, this drum remaining locked in each position between two successive partial rotations through the co-operation of the parts of the plate 9 between the slots 13 and the cam 10.

In the example shown each row of holes 5 is supposed to comprise nine holes and the distance separating two neighbouring rows is supposed to correspond to 1/15th the circumference of the drum 1. The frame 4 forms lateral supports 14 between which are mounted two slides 15 and 16 (Fig. 1). The slide 15 serves to guide a knife 17 held by a plate 18 (Figs. 1 and 13) and the slide 16 serves to guide the punches 19 arranged in the prolongment of one of the radii of the drum 1.

Mounted on the rings or collars 2, supporting the drum 1 at the founding are two supports 20 (Fig. 1) prolonged above the periphery of the drum 1 to receive a shaft 21 on which are pivoted arms 22 forming part of the mechanism for bending the teeth of the clothing. These arms 22 are provided with jaws 23 (Figs. 14 and 16) and are each in one with an arm 24 pivoted to a crank 25 forming part of the operating mechanism for the bending apparatus. In front of the drum 1 is arranged a slide 26 carried by levers 27. This slide is provided with needles 28 serving as piercing apparatus and it is given a lifting movement so as to bring the needles 28 into the prolongation of the row of holes 5 formed in the horizontal plane passing through the axis of the drum 1. A supplementary forward displacement movement of the slide 26 allows the needles 28 to enter into the card clothing 6 and pierce it (Fig. 17) above a stop plate 29 with as many holes as there are teeth to be inserted by the machine. The slide 26 is drilled also with holes 30 corresponding in number to the number of holes 5 forming part of the same row in the drum 1. These holes 30 provide a passage for the teeth at the moment they are inserted in the foundation 6. This insertion is carried out by means of punches 31 (Figs. 1, 8 and 9) carried by a carriage 32 capable of displacement in a slide 33 in a support 34 connecting the two supports 20$^1$ inside the drum 1. Feed stationary nippers 35 and travelling nippers 36 complete the arrangement.

The working of the machine is as follows:

A certain number of wires 37 (nine in the example shown) arranged parallelly in the same plane, the number of which varies with the width of the foundation of the card clothing to be formed and the number of teeth which are to be inserted in the same horizontal line are brought by the travelling nippers 36 to the stationary nippers 35 as described later so that when the nippers 36 draw near to the nippers 35, a certain length of wire is drawn out from these nippers into the surface of the drum 1 into the axis of each of the holes 5 forming part of the same row of holes arranged in the same generatrix of the drum. These wires being held by the stationary nippers 35 (whilst the travelling nippers 36 loosen and return back with the length required for a new feed) the punches 19 guided in the slide 16 are lowered and exert a slight pressure on the central part of the wire so as to start their insertion into the holes 5. At this moment the knife 17 falls and cuts the several wires 37 after which the insertion is completed by the lowering of the nippers 19 (Fig. 12) which are then raised. Owing to the rotation of the main shaft 11, the roller 12 of the cam 10 engages at this moment in one of the slots 13 on the plate 9 and causes the drum 1 to turn one tenth of a turn in the direction of the arrow (Fig. 1) thus bringing the wire inserted in the form of a U below the jaws 23 of the nippers 22 which are at this moment open as shown in Fig. 14, the opening of these nippers being sufficient to allow the passage under the jaws 23 of the ends of the legs 38 of the piece of wire inserted. At the next time of stopping of the drum 1 the jaws 23 of the nippers 22 close and bend the legs 38 of the inserted wire so as to cross the two legs of the wire (Figs. 1 and 15) and thus give to these legs a definite parallel position which remains even in the case where the inserted portion is withdrawn from the hole 5. During these operations, the slide 26 rises at first and brings the needles 28 into the horizontal plane passing through the centre of the drum 1. These needles 28 are then forced into the clothing foundation 6 so as to pierce it in the horizontal plane of the holes which will receive the legs of the portions of the wires 38 inserted in U form. When the slide 26 after having thus pierced the card foundation 6 has been returned to its normal position the holes 30 are found opposite the holes 5 drilled in the drum 1 along a generatrix. The parts of the wire 38 carried by the holes 5 at this moment always point their two legs in a vertical plane. But at this moment, the carriage 32 is displaced in the slide 33, and after the teeth have been caused to rotate, through 90° by the punches 31, so that their two legs are in the same horizontal plane, it forces by means of those punches the wires into the holes pierced in the card foundation 6.

The teeth having passed through the card foundation 6 come in contact beyond the plate stop 29 with the inclined plate 39 where the ends of the teeth are crooked in the ordinary way, to give them the form shown at 40 in Figs. 1 and 17. It will be understood that the wires 37 brought to the drum 1 in the same plane and cut by the knife 17 are inserted simultaneously into all the holes in the same row of holes in the drum.

These wires inserted in U form undergo after that the operation of doubling in half by the nippers 22 which ensures the definite and permanent parallelism of the legs 38 of the inserted part after which each inserted part forming two teeth connected together by a transverse portion is brought opposite the guide 30 formed in the slide 26 and is rotated through 90° by the punches 31 before being forced by the punches into the holes pierced by the needles 26 in the card foundation 6. This foundation is consequently provided along its whole width and at a single operation with the number of teeth which should be provided.

The mechanism controlling the feeding, the insertion, the bending and the rotation of the teeth as well as the piercing of the foundation may evidently be of any suitable type. The drawings show the mechanical arrangements preferably adopted for carrying out these different movements.

Figs. 2 to 10 show more particularly the construction and operating mechanism for the feed nippers. These nippers 35 and 36 are identical in general shape and each comprise fingers 41 corresponding in number to the number of wires worked simultaneously. These fingers are pressed by springs 42 (Figs. 1, 2 and 10) against the lower slide 43 of the frame 44 and are capable of being raised by stirrups 45 (see Fig. 10 which shows the lowered and the raised positions of the stirrup 45 and the fingers 41). The frame 44 of the stationary nippers 35 is mounted between the lateral supports 14 of the frame of the machine and its operating stirrup 45 is moved by two levers 46 keyed to the ends of a shaft 47 suspended in suitable supports between the lateral walls of the machine. The frame 44 of the travelling nippers 36 on the contrary may be moved on the guide rods 48 and receives a to and fro movement with respect to the stationary nippers 35 through two cranks 49 operated by levers 50 pivoted on a stationary spindle 51 carried by a support 52. These levers 50 form an arm 53 on which operates a cam 54 mounted on the shaft 11. In practice a single cam 54 produces the to and fro movement of the crank 49 by its alternate action on the arm 53 and on the arm 50 and the lever formed by these two arms is keyed on the spindle 51 which in this case carries at its other end an arm 55 operating the second crank 49 controlling the frame 44 of the travelling nippers 36 at its other end. The travelling nippers 36 are also provided with a raising stirrup 45. This stirrup is operated by two levers 56 mounted on a shaft 57 carrying a toothed quadran 58 gearing with a toothed quadrant 59 carried by the shaft 47. This latter is provided with an arm 60 on which it operates a cam 61 also carried by the shaft 11, a cam against which the arm 60 is held by a spring 62. The position of the cams 54 and 61 and their action on the levers 50 and 60 are such that when the stationary nippers 35 are closed that is to say when the fingers 41 are pressed by the springs 42 on the wires passing under the fingers the corresponding fingers on the travelling nippers 36 are raised by the levers 56 acting on the stirrup 45.

When the stationary nippers 35 hold the wire the travelling nippers 36 which have brought these wires to the nippers 35 loosen and are returned by the action of the cranks 49, a distance required for closing upon the fingers the length of the wire has to be brought to the nippers 35 for the succeeding operation.

Figure 3:
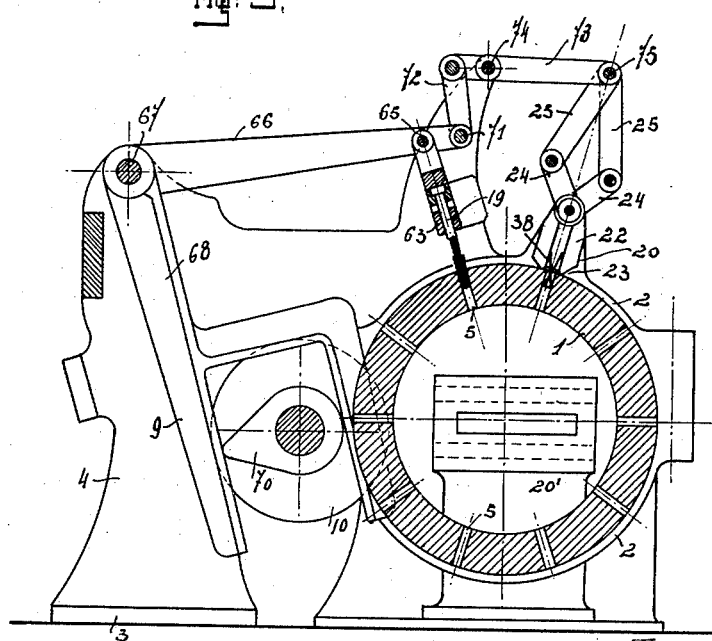
Fig. 3 is a vertical diagrammatic section showing the operating mechanism for the insertion punches and the nippers operating to bend the teeth.

The arms 46 causing the raising of the stirrup 45 operating the position of the fingers of the stationary nippers 35 controls simultaneously through a link the position of the knife 17 passing through the slide 15. Fig. 3 shows the arrangement for operating the insertion nippers 19. As has already been explained these nippers are guided in holes 63 in the slide 16 carried between the lateral walls 14 of the machine. They are carried by a stirrup 64 in two parts, pivoted at 65 to levers 66 keyed on a shaft 67 rotating in supports formed by the walls 14. This shaft carries an arm 68 forming a guide 69 in which operated a cam 70 mounted on the shaft 11 operating the machine.

The levers 66 are pivoted at their end at 71 to cranks acting on levers 73 pivoted at 74 on prolongations of the frame 14 and actuating at 75 the cranks 25 operating the arms 24 of the nippers 22 serving to bend the teeth. As will be easily understood with reference to Fig. 3 owing to the lowering of the nippers 19, the jaws 23 act on the legs 38 of the aforesaid teeth embedded by the nippers 5 of the drum 1. Also when the nippers 19 are raised by the stirup 64 to allow the rotation of the drum 1, the cranks 25 being lowered by the pivot 75 of the levers 73 the jaws 23 are removed as shown in Fig. 14 to leave a free space between their ends and the periphery of the drum 1 sufficient for the passage of the legs 48 of the part of the inserted wire.

As has been described when the embedded and bent teeth reach as the result of the rotation of the drum 1 at the level of the passage where they are inserted into the foundation 6, they are turned so that the plane passing through the two legs of a tooth is vertical. To be inserted in the foundation they should be bent so that all the legs of the teeth in one row may be contained in the same plane.

For this purpose each tooth should as already stated undergo a rotation of 90°. This rotation is obtained through the same mechanism shown in Figs. 4, 5, 8 and 9. Inside the drum 1 and in the horizontal plane passing through the axis of the drum are as already stated the punches 31 (Fig. 1) to the number of nine in the machine shown and the axis of each of these punches coincides with the axis of one of the holes 5 of the drum. These punches are carried by the movable carriage 32 moving in the slide 33 of the support 34. This carriage receives in the slides 33 a to and fro movement from the cranks 76 (Figs. 4 and 5) connected to the stirrups 77 guided on frames 78 and operated by cams 79 mounted on the main shaft 11 of the machine.

The punches 31 (Fig. 1) take part in the to and fro movement of the carriage 32 and also can rotate about themselves through 90°. For this purpose each of them is provided with a small crank 80 (Fig. 9) the pin 81 of which engages in a corresponding hole in a bar 82 which is itself capable of a to and fro movement in the direction of its length that is to say parallel with the axis of the drum 1. This bar 82 is moved with the carriage 32 and for this purpose is provided at its end with a hole 83 (Figs. 4, 5 and 9) sliding on a rod 84 fixed in two levers 85 oscillating about a shaft 86 operated by a cam 87 (Figs. 4 and 5) operating on a lever 88 mounted at the end of the shaft 86 rotating in the supports 89 carried by the machine table.

Owing to this arrangement after each rotation of the drum 1 through one tenth of a turn when the holes 5 each carrying a tooth stop at the level of the punches 31 and consequently at the level of the holes pierced in the foundation 6, the carriage 32 which during the rotation remains stationary moves forward under the action of the cranks 76 drawing with it the punches 31. Each of these latter engages in a hole 5 which is opposite it and comes in contact with the part of the wire forming the connection with the two legs of the tooth (Fig. 8). The ends of the punches 31 are provided with a small slot 90 in which is housed the connecting portion of the two legs of the tooth.

At this moment the carriage 32 is stopped and the punches 31 turn through a quarter of a turn owing to the small arms 80 to which they are connected and which are given a movement by the bar 82, rod 84, levers 85 and 88 and cam 87. Owing to this movement the legs of all of the teeth are brought into the same horizontal plane. The carriage 32 restarts its course and the punches 31 push the teeth towards the outside of the drum 1 pass through the holes 30 of the slide 26 (Fig. 8) of the piercing apparatus and engage in the holes pierced by this apparatus in the foundation 6. By reason of the small slot 90 with which they are provided the punches 31 cannot push the tooth deeply into the foundation but insert it until it comes in contact with the foundation and returns the bar 26 of the piercing apparatus for the next operation.

The movement of the piercing apparatus is produced by mechanism shown separately in Figs. 6 and 7. In fact, the piercing of the foundation is done in the same way as in ordinary simple machines actually known with this difference that all the holes formed in the width of the foundation are pierced at one time, the bar 26 being provided with a number of needles 28 equal to that of the legs to be inserted. As already stated this bar 26 is carried by two arms 27 and is given two movements, one in a vertical direction the other in a horizontal direction. The vertical movement is obtained by the oscillation of the levers 91 pivoting on a trunnion 92 carried by the supports 93 affixed to the table of the machine. These levers 91 are connected to arms 27 by a spindle 94 and are subjected to the action of a cam 95 operating on a roller 96 at the end of the levers 91. The horizontal movement of the slide 26 is obtained from two cranks 97 connected to links 98 pivoted at 99 to supports 100 and operated by a cam 101 mounted on the main shaft 11 of the machine.

The invention is not limited to these details of construction which are given by way of example the different mechanisms may be replaced by other equivalents allowing for carrying out the essential operations indicated in the general description of the operation of the machine.

What I claim is:

1. In an insertion machine for manufacture of card clothing in combination, a rotary drum pierced along generatrices with rows of holes the number of which in each row corresponds to the number of pairs of teeth which should be arranged on the card clothing, a feeding device for the wires, a cutting device for the latter and means whereby all the teeth in one row in the width of the foundation are inserted simultaneously.

2. In an insertion machine for manufacture of card clothing in combination a drum pierced along generatrices with rows of holes, the number of which in each row corresponds to the number of pairs of teeth which should be arranged on the card clothing means whereby a rotary intermittent movement is given to the drum, a feeding device for the wires, means whereby the wires before forming the teeth are brought simultaneously parallel to each other to the said drum, a cutting device for the wires, punches whereby the card teeth thus formed are inserted in the drum, and receive a U shape the said card teeth being brought by the rotation of the drum opposite the perforated foundation and means whereby the said card teeth are forced into the said foundation.

3. In an insertion machine for manufacture of card clothing in combination an intermittently rotating drum pierced along generatrices with rows of holes, the number of which in each row corresponds to the number of pairs of teeth which should be arranged on the card clothing, a feeding device for the wires, means whereby the wires before forming the teeth are brought simultaneously parallel to each other to the said drum, a cutting device for the wires, punches whereby the card teeth thus formed are inserted in the drum and receive a U shape, the said card teeth being brought by the rotation of the drum opposite the perforated foundation and punches whereby the said card teeth are forced into the said foundation.

4. In an insertion machine for manufacture of card clothing in combination an intermittently rotating drum pierced along generatrices with rows of holes the number of which in each row corresponds to the number of pairs of teeth which should be arranged on the card clothing, a feeding device for the wires, means whereby the wires before forming the teeth are brought simultaneously parallel to each other to the said drum, a cutting device for the wires punches whereby the card teeth thus formed are inserted in the drum and receive a U shape, the card teeth being brought by the rotation of the drum opposite a perforated foundation, means whereby the card teeth before insertion in the foundation undergo a rotation of 90° to bring all the legs of the teeth in the same row into the same plane and means whereby the said card teeth are forced into the said foundation.

5. In an insertion machine for manufacture of card clothing in combination an intermittently rotating drum pierced along generatrices with rows of holes, the number of which in each row corresponds to the number of pairs of teeth which should be arranged on the card clothing, means whereby an intermittent rotary movement is given to the drum, a feeding device for the wires, means whereby the wires before forming the teeth are brought simultaneously parallel to each other to the said drum, a cutting device for the wires, punches whereby the card teeth thus formed are inserted in the drum and receive a U shape, means for piercing a foundation, means whereby the card teeth after having been brought opposite the perforated foundation undergo a rotation of 90° to bring all the legs of the teeth in the same row into the same plane and means whereby the said card teeth are forced into the foundation.

6. In an insertion machine for manufacture of card clothing in combination, a drum pierced along generatrices with rows of holes, the number of which in each row corresponds to the number of pairs of teeth which should be arranged on the card clothing, means whereby an intermittent rotary movement is given to the drum, a feeding device for the wires, means whereby the wires before forming the teeth are brought simultaneously parallel to each other to the said drum, a cutting device for the wires, punches whereby the card teeth thus formed are inserted in the drum and receive a U shape, means whereby the card teeth are crossed before insertion in a foundation to keep a parallel direction on their expulsion from the holes in the drum, means whereby the foundation is pierced, means whereby the card teeth after having been brought by the rotation of the drum opposite the perforated foundation undergo a rotation of 90° to bring all the legs of the teeth in the same row into the same plane and means whereby the said card teeth are forced into the foundation.

7. In an insertion machine for manufacture of card clothing, in combination, a drum pierced along generatrices with rows of holes the number of which in each row corresponds to the number of pairs of teeth which should be arranged on the card clothing, means whereby an intermittent rotary movement is given to the drum, a feeding device for the wires, the said feeding device being constituted by stationary feed nippers comprising a frame provided with spring fingers and by similar travelling nippers bringing the wires to the stationary nippers, a cutting device for the wires, punches whereby the card teeth thus formed are inserted in the drum, and receive a U shape means whereby the teeth are crossed before insertion in a foundation and means whereby the card teeth are forced into the foundation after the drum has been rotated and the card teeth have been brought opposite the perforated foundation.

8. In an insertion machine for manufacture of card clothing, in combination, a drum pierced along generatrices with rows of holes the number of which in each row corresponds to the number of pairs of teeth which should be arranged on the card clothing, means whereby an intermittent rotary movement is given to the drum, a feeding device for the wires, the said feeding device being constituted by stationary feed nippers comprising a frame provided with spring fingers and by similar travelling nippers bringing the wires to the stationary nippers, a stirrup for the operation of the stationary nippers, a knife for cutting to length the parts of the wires forming the teeth of the clothing the said knife being acted upon by the operating lever of the stationary nipper stirrup, a first series of punches whereby the card teeth thus formed are inserted in the drum and receive a U shape, means for piercing a foundation, means whereby the card teeth after having been brought opposite the perforated foundation undergo a rotation of 90° to bring all the legs of the teeth into the same plane and a second series of punches whereby the said card teeth are forced into the foundation.

9. In an insertion machine for manufacture of card clothing, in combination a drum pierced along generatrices with rows of holes the number of which in each row corresponds to the number of pairs of teeth which should be arranged on the card clothing, means whereby an intermittent rotary movement is given to the drum, a feeding device for the wires, means whereby the wires before forming the teeth are brought simultaneously parallel to each other to the said drum, a cutting device for the wires, a stationary slide, punches adapted to be displaced in the said slide whereby the card teeth thus formed are inserted in the drum and receive a U shape, a stirrup whereby the punches are acted upon, nippers whereby the teeth are crossed before insertion in a foundation, means whereby the said stirrup and the nippers are simultaneously actuated, means whereby the card teeth after having been brought opposite the perforated foundation, are rotated 90° whereby all the legs of the teeth are brought into the same plane, and means whereby the said card teeth are forced into the foundation.

10. In an insertion machine for manufacture of card clothing in combination a rotary drum receiving an intermittent rotary movement and pierced along generatrices with rows of holes, the number of which in each row corresponds to the number of pairs of teeth which should be arranged on the card clothing, a feeding device for the wires, means whereby the wires before forming the teeth are brought simultaneously parallel to each other to the said drum, a cutting device for the wires, punches whereby the card teeth thus formed are inserted in the drum, the said card teeth being brought by the rotation of the drum opposite the perforated foundation, a carriage arranged inside the rotary drum, means whereby a to and fro movement is given to the said carriage, a series of punches carried by the latter, each of the punches being connected by a crank to a bar to which motion is imparted by the carriage and receiving itself a to and fro movement in the direction of the axis of the drum, whereby the card teeth are inserted into the foundation.

11. In an insertion machine for manufacture of card clothing in combination a drum pierced along generatrices with rows of holes the number of which in each row corresponds to the number of pairs of teeth which should be arranged on the card clothing means whereby a rotary intermittent movement is given to the drum a feeding device for the wires, means whereby the wires before forming the teeth are brought simultaneously parallel to each other to the said drum, a cutting device for the wires, punches whereby the card teeth thus formed are inserted in the drum and receive a U-shape, a slide provided with a number of needles corresponding to the number of legs of teeth to be inserted in one row, means whereby a vertical movement and a horizontal movement are given to the slide, whereby a number of holes are pierced corresponding to the number of two legged teeth to be inserted into a foundation, the said card teeth having been brought by the rotation of the drum opposite the perforated foundation and means whereby the said card teeth are forced into the said foundation.

12. In an insertion machine for the manufacture of card clothing in combination a conveyor having a plurality of rows of holes therein and constituting a die, the number of holes in each row corresponding to the number of pairs of teeth to be arranged on the card clothing, punches cooperating with the conveyor whereby wires are bent in the form of U pieces, a second series of punches, means for intermittently moving the conveyor to carry the U shape pieces to the second series of punches which are adapted to introduce the U shape pieces into a foundation.

In testimony whereof I have affixed my signature.

JEAN GOHY.